US010198072B2

(12) United States Patent
Levesque (10) Patent No.: US 10,198,072 B2
(45) Date of Patent: Feb. 5, 2019

(54) HAPTIC FEEDBACK FOR OPPORTUNISTIC DISPLAYS (71) Applicant: Immersion Corporation, San Jose, CA (US)

(72) Inventor: Vincent Levesque, Montreal (CA)

(73) Assignee: IMMERSION CORPORATION, San Jose, CA (US)

(*) Notice: Subject to any disclaimer, the term of this patent is extended or adjusted under 35 U.S.C. 154(b) by 0 days.

(21) Appl. No.: 15/176,692

(22) Filed: Jun. 8, 2016

(65) Prior Publication Data
US 2017/0357315 A1    Dec. 14, 2017

(51) Int. Cl.
G06F 3/01        (2006.01)
G06F 3/041       (2006.01)

(52) U.S. Cl.
CPC .............. G06F 3/016 (2013.01); G06F 3/013 (2013.01); G06F 3/0416 (2013.01)

(58) Field of Classification Search
CPC . G06F 3/016; G06F 3/14; G06F 3/011; G06F 3/013; A63F 13/285; A63F 2300/1037; A63F 13/216; A63F 13/843; G06K 9/00671; G06T 19/006
See application file for complete search history.

(56) References Cited

U.S. PATENT DOCUMENTS 7,801,569 B1*  9/2010  Zellner ............... H04M 19/041
                                                455/170.1
8,754,758 B1*  6/2014  Ullrich .................... G06F 3/016
                                                340/407.1
2010/0178873 A1*  7/2010  Lee ...................... H04M 1/7253
                                                455/41.3
2011/0037712 A1*  2/2011  Kim ..................... H04M 1/7253
                                                345/173
2014/0256438 A1  9/2014  Grant et al.
2015/0133051 A1*  5/2015  Jamal-Syed ........ H04M 1/7253
                                                455/41.2
2015/0268722 A1  9/2015  Wang et al.
2015/0323993 A1  11/2015  Levesque et al.
2017/0127289 A1*  5/2017  Belz ..................... H04W 40/244

FOREIGN PATENT DOCUMENTS

EP         2 821 911 A1    1/2015

OTHER PUBLICATIONS

European Patent Office Application No. 17275083.8, Extended European Search Report dated Oct. 25, 2017, 9 pages.

* cited by examiner

Primary Examiner — Koosha Sharifi-Tafreshi
(74) Attorney, Agent, or Firm — Kilpatrick Townsend & Stockton LLP (57) ABSTRACT One illustrative system disclosed herein includes a computing device in communication with a sensor configured to detect a display device near the sensor, the computing device, or within a field of view of a user of the computing device. The sensor can also be configured to transmit a signal associated with the display device to a processor in communication with the sensor. The processor is configured to determine an availability of the display device to display or output content (e.g., texts, images, sounds, videos, etc.) and a location of the display device based on the signal. The processor is also configured to determine a haptic effect based on the availability and the location of the display device and transmit a haptic signal associated with the haptic effect. The illustrative system also includes a haptic output device configured to receive the haptic signal and output the haptic effect.

20 Claims, 5 Drawing Sheets

HAPTIC FEEDBACK FOR OPPORTUNISTIC DISPLAYS

FIELD OF INVENTION

The present disclosure relates generally to user interface devices. More specifically, but not by way of limitation, this disclosure relates to haptic feedback for opportunistic displays.

BACKGROUND

Many modern devices include a display device that can be used to provide content to a user of the device. The content can include text, images, sounds, videos, etc. A spectator (e.g., another user looking at the device) may also view content provided on the display device. Some display devices, however, may lack haptic feedback capabilities. Moreover, the spectator's attention may not be drawn to the display if the display is providing content that may be relevant to the spectator.

SUMMARY

Various embodiments of the present disclosure provide systems and methods for providing haptic feedback for opportunistic displays.

In one embodiment, a system of the present disclosure may comprise a computing device and a sensor communicatively coupled to the computing device. The sensor can be configured to detect a display device proximate to the sensor and within a field of view of a user of the computing device and transmit a signal associated with the display device. The system also comprises a processor in communication with the sensor, the processor is configured to receive the signal from the sensor and determine an availability of the display device to display or output content (e.g., texts, images, sounds, videos, animated graphics, etc.) to the user and determine a location of the display device based on the signal. The processor can also be configured to determine a first haptic effect based at least in part on the availability of the display device and the location of the display device. The processor can transmit a first haptic signal associated with the first haptic effect. The system may further comprise a haptic output device configured to receive the first haptic signal and output the first haptic effect.

In another embodiment, a method of the present disclosure may comprise: detecting, by a sensor communicatively coupled to a computing device, a display device proximate to the sensor and within a field of view of a user of the computing device; transmitting, by the sensor, a sensor signal associated with the display device to a processor. The method may also comprise determining, by the processor, an availability of the display device to output content to the user and a location of the display device based at least in part on the sensor signal. The method may also comprise determining, by the processor, a first haptic effect based at least in part on the availability of the display device and the location of the display device. The method may also comprise transmitting, by the processor, a first haptic signal associated with the first haptic effect to a haptic output device. The haptic output device may be configured to receive the first haptic signal and output the first haptic effect. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference now will be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations that come within the scope of the appended claims and their equivalents.

Illustrative Examples of Haptic Feedback for Opportunistic Displays

One illustrative embodiment of the present disclosure comprises a computing device, such as a smartphone or a smartwatch. The computing device comprises a sensor, a memory, a haptic output device, and a processor in communication with each of these elements.

In the illustrative embodiment, the sensor may detect an opportunistic display device near the computing device. An opportunistic display device includes a display device that is proximate to the computing device, the sensor, or a user of the computing device (e.g., a user wearing the smartwatch or a user of the smartphone) and can be used to output or display content to the user of the computing device or another user. For example, the opportunistic display device can be a display device on another smartphone, smartwatch, or other display device near the user and within the field of view of the user of the computing device and able to communicate with the computing device such that the display device can be used to provide content to the user. Thus, for example, the user could receive content on the user's computing device but wish to see the content displayed on the opportunistic display. For instance, if the user is sitting across from another person and can see the other person's smartwatch display, the user may wish certain text messages to be displayed on the other person's smartwatch display while the smartwatch is in the user's field of view. Doing so allows the user to see the content of the text message without having to access or view the user's own computing device and with minimal disruption to the other person.

In the illustrative embodiment, the sensor detects the opportunistic display device and transmits a signal to the processor, which determines an availability and location of the opportunistic display device based on the signal. The availability of the opportunistic display device can indicate that the opportunistic display device is available to display content to the user and/or is displaying content to the user. In such an embodiment, the processor can be configured to transmit data that includes content to the opportunistic display device to be output by the opportunistic display device. In the illustrative embodiment, the processor is configured to determine a first haptic effect based at least in part on the availability of the opportunistic display device and a second haptic effect based at least in part on the location of the opportunistic display device. These haptic signals may be combined to form a single, composite haptic effect.

In the illustrative embodiment, the processor is configured to transmit a first haptic signal associated with the first haptic effect and a second haptic signal associated with the second haptic effect to a haptic output device. The haptic output device is configured to output one or more first haptic effects (e.g., textures, vibrations, stroking sensations, and/or stinging sensations) associated with the availability of the opportunistic display device. In the illustrative embodiment, the one or more first haptic effects can indicate to the user of the computing device that the opportunistic display device is available (e.g., displaying content received from the processor, which may be relevant to the user).

In the illustrative embodiment, the haptic output device is also configured to output one or more second haptic effects associated with the location of the opportunistic display device. In such an embodiment, the one or more second haptic effects indicate to the user of the computing device the location of the opportunistic display device (e.g., where the user should look to view content being displayed on the opportunistic display device). In this manner, the first and second haptic effects indicate to the user of the computing device when and where to look to view content displayed on the opportunistic display device.

In the illustrative embodiment, the opportunistic display device may comprise a sensor, a memory, a haptic output device, and a processor in communication with each of these elements. In such an embodiment, the sensor may detect a field of view of the user of the computing device or a direction of an eye gaze of the user. For example, the opportunistic display may comprise a video screen with an embedded or proximate sensor for detecting a passing user's field of view with respect to the video screen. The sensor can transmit a signal to the processor, which transmits a haptic signal based on the direction of the field of view of the user of the computing device to the haptic output device. The haptic output device is configured to receive the haptic signal from the processor and output one or more haptic effects associated with the field of view of the user of the computing device. In the illustrative embodiment, the haptic output effects can indicate to another user associated with the opportunistic display device (e.g., a user wearing a smartwatch that is being used as the opportunistic display device) that the user of the computing device is looking at the opportunistic display device.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Illustrative Systems for Haptic Feedback for Opportunistic Displays

Figure 1:
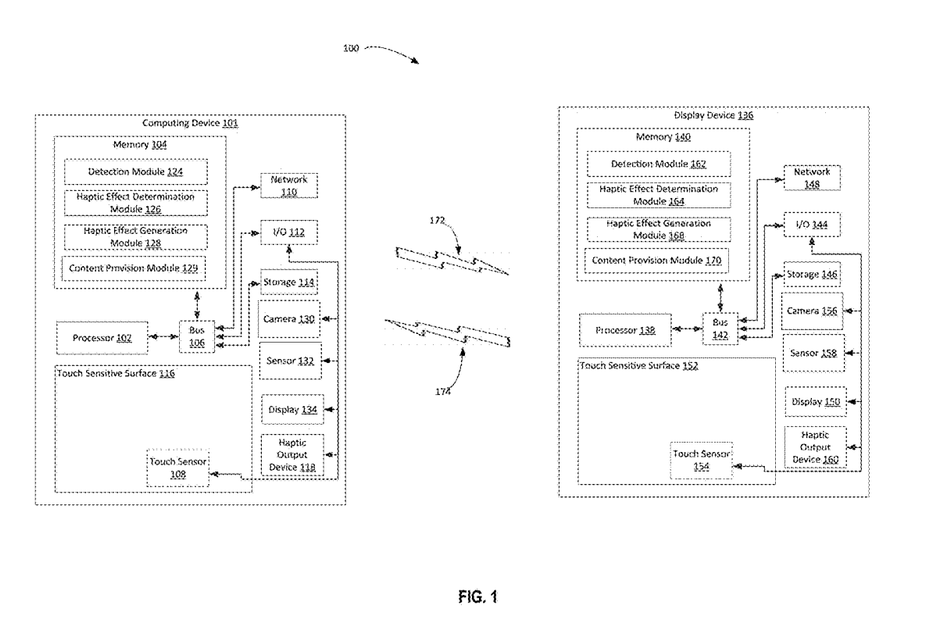
FIG. 1 is a block diagram showing a system for haptic feedback for opportunistic displays according to one embodiment.

FIG. 1 is a block diagram showing a system 100 for haptic feedback for opportunistic displays according to one embodiment. In the embodiment depicted in FIG. 1, the system 100 comprises a computing device 101 having a processor 102 in communication with other hardware via a bus 106. The computing device 101 may comprise, for example, a mobile device (e.g., a smartphone), tablet, e-reader, smartwatch, a head-mounted display, glasses, a wearable device, etc.

A memory 104, which can comprise any suitable tangible (and non-transitory) computer-readable medium such as RAM, ROM, EEPROM, or the like, embodies program components that configure operation of the computing device 101. In the embodiment shown, computing device 101 further includes one or more network interface devices 110, input/output (I/O) interface components 112, and storage 114.

Network interface device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate wired or wireless connection to devices such as one or more displays 134, game controllers, keyboards, mice, joysticks, cameras, buttons, speakers, microphones and/or other hardware used to input or output data. Storage 114 represents nonvolatile storage such as magnetic, optical, or other storage media included in computing device 101 or coupled to the processor 102.

In some embodiments, the computing device 101 includes a touch sensitive surface 116. Touch sensitive surface 116 represents any surface that is configured to sense tactile input of a user. One or more touch sensors 108 are configured to detect a touch in a touch area (e.g., when an object contacts the touch sensitive surface 116) and transmit signals associated with the touch to the processor 102. Any suitable number, type, or arrangement of touch sensor 108 can be used. For example, resistive and/or capacitive sensors may be embedded in touch sensitive surface 116 and used to determine the location of a touch and other information, such as pressure, speed, and/or direction.

The touch sensor 108 can additionally or alternatively comprise other types of sensors. For example, optical sensors with a view of the touch sensitive surface 116 may be used to determine the touch position. As another example, the touch sensor 108 may comprise a LED (Light Emitting Diode) finger detector mounted on the side of a display. In some embodiments, touch sensor 108 may be configured to detect multiple aspects of the user interaction. For example, touch sensor 108 may detect the speed, pressure, and direction of a user interaction, and incorporate this information into the signal transmitted to the processor 102.

In some embodiments, the computing device 101 comprises a touch-enabled display that combines a touch sensitive surface 116 and a display 134 of the computing device 101. The touch sensitive surface 116 may correspond to the display 134 exterior or one or more layers of material above components of the display 134. In other embodiments, the computing device 101 comprises a touch sensitive surface 116, which may be mapped to a graphical user interface provided in the display 134 that is included in the system 11 interfaced to computing device 101.

In some embodiments, computing device 101 comprises a camera 130. Although the camera 130 is depicted in FIG. 1 as being internal to the computing device 101, in some embodiments, the camera 130 may be external to and in communication with the computing device 101. As an example, the camera 130 may be external to and in communication with the computing device 101 via wired interfaces such as, for example, Ethernet, USB, IEEE 1394, and/or wireless interfaces such as IEEE1 802.11, Bluetooth, or radio interfaces.

In some embodiments, the computing device 101 comprises one or more sensors 132. In some embodiments, the sensor 132 may comprise, for example, gyroscope, an accelerometer, a global positioning system (GPS) unit, a range sensor, a depth sensor, a Bluetooth device, a camera, an infrared sensor, a quick response (QR) code sensor, etc. In some embodiments, the sensor 132 may comprise a camera including, as an example, a body-worn camera (e.g., Google Glass) that can identify devices. In some embodiments, the computing device 101 may comprise a wearable device (e.g., glasses) and the sensor 132 may comprise any device for detecting eye gaze, line-of-sight, or field of view of a user of the computing device 101. In some embodiments, the sensor 132 is external to the computing device 101 and in wired or wireless communication with the computing device.

In some embodiments, the sensor 132 may detect an availability, presence, or location of an opportunistic display device (e.g., a display device 136, or another computing device) that is proximate to the sensor 132, the computing device 101, or a user of the computing device 101. As an example, the sensor 132 may be a Bluetooth device or other network device configured to detect a presence and location of another Bluetooth device (e.g., a Bluetooth display device) or network device by analyzing signal strength between the sensor 132 and the display device. In some embodiments, the sensor 132 may detect a distance between the sensor 132, the computing device 101, or a user of the computing device 101, and the display device (e.g., based on the strength of the Bluetooth signal between in the sensor 132 and the display device). As another example, the sensor 132 may determine the availability, presence, or location of the display device using indoor positioning technology. In still another example, the sensor 132 may transmit data about a position or location of the sensor 132, the computing device 101, or a user of the computing device 101 to a server or other device. In response, the server or other device may transmit data about a position, location, or availability of other devices (e.g., display device 136) that are near the sensor 132 or computing device 101 based on the data transmitted by the sensor 132.

In some embodiments, the sensor 132 may detect other data about devices near the sensor 132. For example, the sensor 132 may detect a type, size, shape, etc., of devices near the sensor 132 (e.g., the display device 136).

In some embodiments, the processor 102 may be in communication with a single sensor 132 and, in other embodiments, the processor 102 may be in communication with a plurality of sensors 132, for example, a gyroscope, an accelerometer, and a Bluetooth device. The sensor 132 is configured to transmit sensor signals to the processor 102.

In some embodiments, the system 100 further includes haptic output device 118 in communication with the processor 102. Haptic output device 118 is configured to output a haptic effect in response to a haptic signal. For example, the haptic output device 118 can output a haptic effect in response to a haptic signal from the processor 102. In some embodiments, haptic output device 118 is configured to output a haptic effect comprising, for example, a vibration, a squeeze, a poke, a change in a perceived coefficient of friction, a simulated texture, a stroking sensation, an electro-tactile effect a surface deformation (e.g., a deformation of a surface associated with the computing device 101), and/or a puff of a solid, liquid, or gas. Further, some haptic effects may use multiple haptic output devices 118 of the same or different types in sequence and/or in concert. Although a single haptic output device 118 is shown in FIG. 1, some embodiments may use multiple haptic output devices 118 of the same or different type to produce haptic effects.

In some embodiments, the haptic output device 118 is in communication with the processor 102 and internal to the computing device 101. In other embodiments, the haptic output device 118 is external to the computing device 101 and in communication with the computing device 101 (e.g., via wired interfaces such as Ethernet, USB, IEEE 1394, and/or wireless interfaces such as IEEE 802.11, Bluetooth, or radio interfaces). For example, the haptic output device 118 may be associated with (e.g., coupled to) a wearable device (e.g., a wristband, bracelet, hat, headband, etc.) and configured to receive haptic signals from the processor 102.

In some embodiments, the haptic output device 118 is configured to output a haptic effect comprising a vibration. The haptic output device 118 may comprise, for example, one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some embodiments, the haptic output device 118 is configured to output a haptic effect modulating the perceived coefficient of friction of a surface associated with the haptic output device 118. In one embodiment, the haptic output device 118 comprises an ultrasonic actuator. An ultrasonic actuator may vibrate at an ultrasonic frequency, for example 20 kHz, increasing or reducing the perceived coefficient of friction of the surface associated with the haptic output device 118. In some embodiments, the ultrasonic actuator may comprise a piezo-electric material.

In some embodiments, the haptic output device 118 uses electrostatic attraction, for example by use of an electrostatic actuator, to output a haptic effect. The haptic effect may comprise a simulated texture, a simulated vibration, a stroking sensation, or a perceived change in a coefficient of friction on a surface associated with computing device 101 (e.g., the touch sensitive surface 116). In some embodiments, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, the processor 102 may operate the electrostatic actuator by applying an electric signal, for example an AC signal, to the conducting layer. In some embodiments, a high-voltage amplifier may generate the AC signal. The electric signal may generate a capacitive coupling between the conducting layer and an object (e.g., a user's finger or other body part, or a stylus) near or touching the touch sensitive surface 116. Varying the levels of attraction between the object and the conducting layer can vary the haptic effect perceived by a user.

In some embodiments, the haptic output device 118 comprises a deformation device configured to output a deformation haptic effect. The deformation haptic effect may comprise raising or lowering portions of a surface associated with the computing device 101. For example, the deformation haptic effect may comprise raising portions of the touch sensitive surface 116. In some embodiments, the deformation haptic effect may comprise bending, folding, rolling, twisting, squeezing, flexing, changing the shape of, or otherwise deforming a surface associated with the computing device 101. For example, the deformation haptic effect may apply a force on the computing device 101 or a surface associated with the computing device 101 (e.g., the touch sensitive surface 116), causing it to bend, fold, roll, twist, squeeze, flex, change shape, or otherwise deform.

In some embodiments, the haptic output device 118 comprises fluid configured for outputting a deformation haptic effect (e.g., for bending or deforming a surface associated with the computing device 101). For example, the fluid may comprise a smart gel. A smart gel comprises a fluid with mechanical or structural properties that change in response to a stimulus or stimuli (e.g., an electric field, a magnetic field, temperature, ultraviolet light, shaking, or a pH variation). For instance, in response to a stimulus, a smart gel may change in stiffness, volume, transparency, and/or color. In some embodiments, stiffness may comprise the resistance of a surface associated with the computing device 101 (e.g., the touch sensitive surface 116) against deformation. In some embodiments, one or more wires may be embedded in or coupled to the smart gel. As current runs through the wires, heat is emitted, causing the smart gel to expand or contract, which may cause the computing device 101 or a surface associated with the computing device 101 to deform.

As another example, the fluid may comprise a rheological (e.g., a magneto-rheological or electro-rheological) fluid. A rheological fluid comprises metal particles (e.g., iron particles) suspended in a fluid (e.g., oil or water). In response to an electric or magnetic field, the order of the molecules in the fluid may realign, changing the overall damping and/or viscosity of the fluid. This may cause the computing device 101 or a surface associated with the computing device 101 to deform.

In some embodiments, the haptic output device 118 comprises a mechanical deformation device. For example, in some embodiments, the haptic output device 118 may comprise an actuator coupled to an arm that rotates a deformation component. The deformation component may comprise, for example, an oval, starburst, or corrugated shape. The deformation component may be configured to move a surface associated with the computing device 101 at some rotation angles but not others. The actuator may comprise a piezo-electric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move the surface, causing it to deform. In such an embodiment, the deformation component may begin in a position in which the surface is flat. In response to receiving a signal from processor 102, the actuator may rotate the deformation component. Rotating the deformation component may cause one or more portions of the surface to raise or lower. The deformation component may, in some embodiments, remain in this rotated state until the processor 102 signals the actuator to rotate the deformation component back to its original position.

Further, other techniques or methods can be used to deform a surface associated with the computing device 101. For example, the haptic output device 118 may comprise a flexible surface layer configured to deform its surface or vary its texture based upon contact from a surface reconfigurable haptic substrate (including, but not limited to, e.g., fibers, nanotubes, electroactive polymers, piezoelectric elements, or shape memory alloys). In some embodiments, the haptic output device 118 is deformed, for example, with a deforming mechanism (e.g., a motor coupled to wires), air or fluid pockets, local deformation of materials, resonant mechanical elements, piezoelectric materials, micro-electro-mechanical systems ("MEMS") elements or pumps, thermal fluid pockets, variable porosity membranes, or laminar flow modulation.

Turning to memory 104, modules 124, 126, and 128, 129 are depicted to show how a device can be configured in some embodiments to provide haptic feedback for opportunistic displays.

In this example, a detection module 124 configures the processor 102 to monitor the touch sensitive surface 116 via the touch sensor 108 to determine a position of a touch. For example, the detection module 124 may sample the touch sensor 108 in order to track the presence or absence of a touch and, if a touch is present, to track one or more of the location, path, velocity, acceleration, pressure and/or other characteristics of the touch over time.

In some embodiments, a content provision module 129 configures the processor 102 to provide content (e.g., texts, images, sounds, videos, etc.) to a user (e.g., to a user of the computing device 101 or another user). As an example, the content provision module 129 configures the processor 102 to provide an image in any format (e.g., in an animated graphics interchange format) to the user. If the content includes computer generated images, the content provision module 129 is configured to generate the images for display on a display device (e.g., the display 134 of the computing device, the display device 136, or another display communicatively coupled to the processor 102). If the content includes video and/or still images, the content provision module 129 is configured to access the video and/or still images and generate views of the video and/or still images for display on the display device. If the content includes audio content, the content provision module 129 is configured to generate electronic signals that will drive a speaker, which may be part of the display device, to output corresponding sounds. In some embodiments, the content, or the information from which the content is derived, may be obtained by the content provision module 129 from the storage 114, which may be part of the computing device 101, as illustrated in FIG. 1, or may be separate from the computing device 101 and communicatively coupled to the computing device 101. In some embodiments, the content provision module 129 can cause the processor 102 to transmit content to another device. As an example, the content provision module 129 can generate or access content and cause the processor to transmit the content to the display device 136.

In some embodiments, the haptic effect determination module 126 represents a program component that analyzes data to determine a haptic effect to generate. The haptic effect determination module 126 may comprise code that selects one or more haptic effects to output using one or more algorithms or lookup tables. In some embodiments, the haptic effect determination module 126 comprises one or more algorithms or lookup tables usable by the processor 102 to determine a haptic effect.

Particularly, in some embodiments, the haptic effect determination module 126 may determine a haptic effect based at least in part on sensor signals received from the sensor 132. For example, the processor 102 may receive sensor signals from the sensor 132 and determine an availability of a display device (e.g., a display device 136) near the computing device 101. The haptic effect determination module 126 may determine a first haptic effect based at least in part on the determined availability of the display device. For example, in one such embodiment, the haptic effect determination module 126 may determine a first haptic effect that is output to a user associated with the computing device 101 (e.g., a user wearing the computing device) to indicate to the user that the display device is available (e.g., displaying content, which may be relevant to the user).

For instance, the display device 136 may be near the computing device 101 and the sensor 132 can detect the display device 136 via Bluetooth (e.g., based on a strength of the Bluetooth signal between the sensor 132 and the display device 136). The computing device 101 can receive a signal from the sensor 132 and determine that the display device 136 is available (e.g., that the display device 136 is discoverable and available to connect to the computing device 101 via Bluetooth to receive content from the computing device 101). The haptic effect determination module 126 may determine a vibration or a series of vibrations to be output to indicate to the user that the display device 136 is near the user and is receiving content from the computing device 101 via Bluetooth to be displayed by the display device 136.

In some embodiments, the processor 102 may receive sensor signals from the sensor 132 and determine a location or position of the display device. In such an embodiment, the processor 102 may determine a distance between the sensor 132, the computing device 101, or a user associated with the computing device 101 or sensor 132, and the display device 136. The haptic effect determination module 126 may determine a second haptic effect based at least in part on the determined location or position of the display device. The second haptic effect may include one or more haptic effects that can indicate the location or position of the display device 136. In some embodiments, the haptic effect determination module 126 may determine a characteristic (e.g., magnitude, duration, location, type, frequency, etc.) of a haptic effect based on the location or position of the display device 136. For example, in one such embodiment, the haptic effect determination module 126 may determine a second haptic effect that is output to the user of the computing device 101 to indicate to the user the location (e.g., the vertical or horizontal position) of the display device 136 relative to the user.

As an example, the haptic effect determination module 126 may determine a haptic effect if the display device 136 is positioned to the left of the user and another haptic effect if the display device 136 is in front of the user and still another haptic effect if the display device 136 is above the user. As another example, the haptic effect determination module 126 may determine a weak or short haptic effect if the user is far from the display device 136 or a strong or long haptic effect if the user is near the display device 136.

In some embodiments, the haptic effect determination module 126 may determine sequential haptic feedback to indicate to the user the location of the display device 136 relative to the user. In such embodiments, the haptic effect determination module 126 may determine one or more haptic effects that can create the perception of a flow toward a direction (e.g., by determining a series of haptic outputs along an arm of a user), which can indicate a direction of the display device 136 relative to the user.

In some embodiments, the computing device 101 may include one or more haptic output devices 118 for providing various output effects associated with the location of a device (e.g., the display device 136) relative to the user of the computing device 101.

In some embodiments, the processor 102 may receive sensor signals from the sensor 132 and determine a size, type, shape, or other attribute of the display device. In such an embodiment, the haptic effect determination module 126 may determine one or more haptic effects to indicate the size, type, shape, or other attribute of the display device. For example, the haptic effects may be selected based on the size of the display device (e.g., a strong vibration if the display device is large, for example, a large LCD screen, and a weaker vibration if the display device is small, for example, a smartwatch).

In another embodiment, the haptic effect determination module 126 may comprise code that determines a haptic effect based on content provided by the content provision module 129. For example, the content provision module 129 may provide visual content to be output on the display device 136. In one embodiment, the haptic effect determination module 126 may determine a haptic effect associated with the visual content. For example, in one such embodiment, the haptic effect determination module 126 may determine a haptic effect for providing a haptic track associated with a video being provided by the display device 136. A haptic track can include a haptic effect (e.g., a vibration) or a series of haptic effects that correspond to the events occurring in the video being provided. For instance, if the video includes a series of explosions, the haptic track can be a series of vibrations that correspond to each explosion. Thus, as the user watches the video, the user may perceive the haptic effects associated with the video.

In some embodiments, the haptic effect determination module 126 may comprise code that determines, based on a location of a touch on the touch sensitive surface 116, a haptic effect to output and code that selects one or more haptic effects to provide in order to simulate the effect. For example, different haptic effects may be selected based on the location of a touch in order to simulate the presence of a virtual object (e.g., a virtual piece of furniture, automobile, animal, cartoon character, button, lever, logo, or person) on the display 134. Further, in some embodiments, haptic effect determination module 126 may comprise code that determines, based on the size, color, location, movement, and/or other characteristics of a virtual object, a haptic effect to output and code that selects one or more haptic effects to provide in order to simulate the effect. For example, haptic effects may be selected based on the color of a virtual object (e.g., a strong vibration if the virtual object is red, and a weaker vibration if the virtual object is green).

In some embodiments, the haptic effect determination module 126 comprises code that determines a haptic effect based on an event. An event, as used herein, is any interaction, action, collision, or other event which occurs during operation of the computing device 101, which can potentially comprise an associated haptic effect. In some embodiments, an event may comprise user input (e.g., a button press, manipulating a joystick, interacting with a touch sensitive surface 116, tilting or orienting the device), a system status (e.g., low battery, low memory, or a system notification, such as a notification generated based on the system receiving a message, an incoming phone call, a notification, or an update), sending data, receiving data, or a program event (e.g., if the program is a game, a program event may comprise explosions, gunshots, collisions, interactions between game characters, advancing to a new level, or driving over bumpy terrain).

In some embodiments, the haptic effect generation module 128 represents programming that causes the processor 102 to generate and transmit haptic signals to the haptic output device 118 to generate the selected haptic effect. In some examples, the haptic effect generation module 128 causes the haptic output device 118 to generate a haptic effect determined by the haptic effect determination module 126. For example, the haptic effect generation module 128 may access stored waveforms or commands to send to the haptic output device 118 to create the selected haptic effect. In some embodiments, the haptic effect generation module 128 may comprise algorithms to determine the haptic signal. The haptic effect generation module 128 may comprise algorithms to determine target coordinates for the haptic effect (e.g., coordinates for a location on the computing device 101, such as on the touch sensitive surface 116, at which to output the haptic effect).

In some embodiments, the display device 136 includes processor 138, a memory 140, a bus 142, I/O components 144, storage 146, network interface device 148, display 150, touch sensitive surface 152, touch sensors 154, camera 156, sensors 158, and haptic output device 160, each of which may be configured in substantially the same manner as the memory 104, the processor 102, bus 106, I/O components 112, storage 114, network interface device 110, display 134, touch sensitive surface 116, touch sensors 108, camera 130, sensors 132, and haptic output device 118 of the computing device 101, although they need not be. In some embodiments, the display device 136 may include all or some of the components depicted in FIG. 1.

In some embodiments, the display device 136 comprises, for example, a mobile device (e.g., a smartphone), tablet, e-reader, smartwatch, a head-mounted display, glasses, a wearable device, an interactive kiosk, an interactive poster, a screen of a cash register, or any other device that includes a display for providing content.

The computing device 101 may be communicatively coupled to the display device 136. For example, the computing device 101 and the display device 136 can communicate (e.g., transmit or receive data or signals 172, 174) using network interface devices 110 and 148. As an example, the computing device 101 and the display device 136 can each be connected to a common wireless network and can communicate via the wireless network. As another example, the computing device 101 and the display device 136 can be communicatively coupled via a Bluetooth connection.

In some embodiments, the display device 136 may be an opportunistic display device. For example, the display device 136 can be a display device near a user of the computing device 101 and within the field of view of the user such that the display device 136 can be used to provide content to the user.

In some embodiments, the sensor 158 of the display device 136 may detect a presence or location of another device (e.g., the computing device 101). For example, the sensor 158 may be configured in substantially the same manner as sensor 132 for detecting the presence or location of another device.

In some embodiments, the sensor 158 may detect a direction of a field of view of the user of the computing device 101. For example, the sensor may include any device used to detect eye gaze, line-of-sight, or field of view of the user. For example, the sensor 158 may include a camera configured to capture an image of the eye of the user of the computing device 101 and the processor 138 can determine the direction of the field of view of the user of the computing device 101 based at least in part on the image by using various image processing methods and technique. In another embodiment, the sensor 158 is configured to monitor movements of an eye of the user or muscles near an eye of the user of the computing device 101 and the processor 138 is configured to determine the direction of the user's field of view based at least in part on the monitored movements. In still another embodiment, the sensor 158 may be configured to monitor or measure electrical activity of muscles moving the eye of the user of the computing device 101 and the processor 138 can be configured to determine the direction of the user's field of view. In some embodiments, the sensor 158 may include other sensors used to determine a user's intent or volition, including, for example, sensors associated with functional magnetic resonance imaging (fMRI) or electroencephalogram (EEG). In still another embodiment, the sensor 158 may detect the user's eye gaze, line-of-sight, or field of view through various methods and techniques, including for example, analyzing the user's body or head posture.

In some embodiments, the memory 140 includes modules 162, 164, 168, 170. In some embodiments, the memory 140 includes all or some of the modules 162, 164, 168, 170. The modules 162, 164, 168, 170 can each be configured in substantially the same manner as respective modules 124, 126, 128, and 129 of the computing device 101.

In some embodiments, the haptic effect determination module 164 may determine a haptic effect based at least in part on sensor signals received from the sensor 158. In some embodiments, the processor 138 may receive sensor signals from the sensor 158 and determine a direction of an eye gaze or field of view of a user of the computing device 101. Based on this determination, the haptic effect determination module 164 may determine a haptic effect. For example, in one such embodiment, the processor 138 may determine that the user of the computing device 101 is looking at, or in the direction of, the display device 136 (e.g., at the display 150 of the display device). Based on this determination, the haptic effect determination module 126 may determine a haptic effect that is output to the user of the display device 136 to indicate that the user of the computing device 101 is looking at the display device 136. For instance, a smartwatch might vibrate briefly to indicate that another user is viewing the display device 136. In this manner, the user of the display device 136 may become aware that a person (e.g., the user of the computing device 101) is looking at (e.g., reading) content on the display device that may be relevant to the person.

In some embodiments, the haptic effect determination module 126 may determine another haptic effect based on the direction of the eye gaze or field of view of the user of the computing device 101 to indicate to the user of the display device 136 how to orient the display device 136. For example, the haptic effect may indicate to the user of the display device 136 that the user should adjust an arm, wrist, leg, or hand, to allow the user of the computing device 101 to view content on the display device 136. For instance, a smartwatch on the user's wrist may vibrate toward the top of the smartwatch (e.g., toward the top of the user's wrist) to indicate to the user that another person (e.g., the user of the computing device 101) is looking at the top of the display of the smartwatch so that the user can adjust the user's wrist such that the top of the display is more visible to the other person.

In some embodiments, the content provision module 170 can be configured in substantially the same manner as the content provision module 129 and can configure the processor 138 to provide content (e.g., texts, images, sounds, videos, animated graphics, etc.) to a user (e.g., to a user of the computing device 101, the user of the display device 136, or another user). In some embodiments, the content, or the information from which the content is derived, may be obtained from another device (e.g., the computing device 101). For example, the content provision module 129 can be configured to cause the processor to receive data that includes content from the computing device 101. The content may displayed by the display device 136 (e.g., via the display 150).

Figure 2:
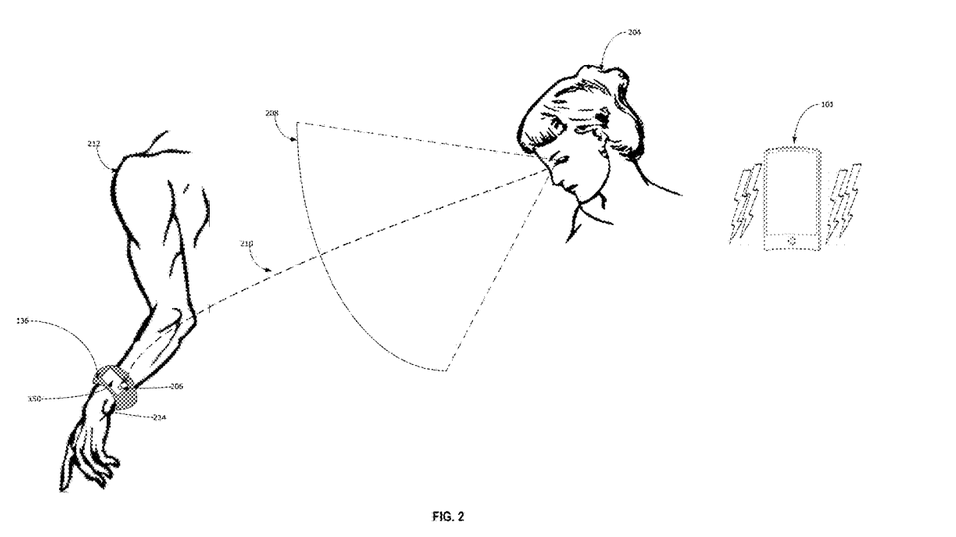
FIG. 2 shows an embodiment of a system for haptic feedback for opportunistic displays according to one embodiment.

FIG. 2 shows an embodiment of a system for haptic feedback for opportunistic displays. The system includes a computing device 101 and a display device 136. In the example shown in FIG. 2, the display device 136 is an opportunistic display device (e.g., the display device 136 is configured to display content, for example, via display 150, and is within the field of view 208 of 204 of the computing device 101.

The computing device 101 comprises a sensor (e.g., the sensor 132 of FIG. 1). In some embodiments, the sensor may be internal to the computing device 101 or external to the computing device. The sensor may be configured to detect devices proximate to the computing device 101 or a user 204 associated with the computing device 101 (e.g., a user using or wearing the computing device 101).

In the embodiment shown in FIG. 2, the sensor may detect a display device 136 that is near the sensor, the computing device 101, or the user 204. In some embodiments the sensor may detect the display device 136 and transmit sensor signals associated with the display device 136 to a processor associated with the computing device 101 (e.g., the processor 102 of FIG. 1). The sensor signal can correspond to any attribute of the display device. For example, the sensor signal can indicate an availability of the display device 136. For example, the display device 136 can be available to provide or output content (e.g., text, alerts, sounds, images, video, animated graphics, etc.) via a display 150. In some embodiments, the sensor signal can indicate a location of the display device 136 (e.g., a location or position of the display device relative to the sensor, the computing device 101, or the user 204). In another embodiment, the sensor signal can indicate a type, size, or shape of the display device 136.

In some embodiments, the computing device 101 may determine and output one or more haptic effects based at least in part on the sensor signals. The haptic effects may each comprise a vibration or any other haptic effect. For example, the computing device 101 may receive sensor signals and determine that the display device 136 is available (e.g., nearby, within the field of view 208 of the user 204, and/or displaying content that is relevant to the user 204). In some embodiments, the content may be transmitted from the computing device 101 to the display device 136. The computing device 101 may output a haptic effect (e.g., a short vibration) to a body part of the user 204 (e.g., an arm, leg, wrist, hand, or other body part) to indicate to the user 204 that the display device 136 is available.

In some embodiments, the computing device 101 may output one or more other haptic effects to a body part of the user 204 to indicate to the user the location or position of the display device (e.g., relative to the user 204). For example, in some embodiments, the computing device 101 outputs a haptic effect to indicate to the user 204 that the display device 136 is up or down relative to the user 204. As another example, the computing device 101 outputs a haptic effect to indicate to the user 204 that the display device 136 is to the left or right of the user 204. In still another example, the computing device 101 outputs a haptic effect to indicate to the user 204 that the display device 136 is in front of, or behind, the user 204.

As an illustrative example, the computing device 101 may comprise a wearable device (e.g., a wristband or headband) and may comprise one or more haptic output devices. The computing device 101 may be configured to output a haptic effect to a left side of the computing device 101 or body of the user 204 (e.g., if the user has a wristband on a left wrist or if a haptic output device is positioned on the left side of the body of the user 204) to indicate to the user 204 that the display device 136 is to the left of the user. The computing device 101 may also be configured to output a haptic effect to a top part of the computing device 101 or body part of the user 204 (e.g., a top part of the wrist of the user 204 if the user is wearing a wristband) to indicate to the user that the display device 136 is in front or above the user 204. In still another embodiment, the computing device 101 may output a weak haptic effect (e.g., a weak vibration) when the user is far from the display device 136 and a strong haptic effect (e.g., a strong vibration) when the user 204 is close to the display device 136.

In this manner, the computing device 101 may indicate to the user 204 the horizontal and/or vertical position of the display device 136 so that the user 204 may view content provided on the display device 136, which may be relevant to the user 204 (e.g., content being provided by the computing device 101).

In another embodiment, the computing device 101 may output one or more other haptic effects to the user 204 to indicate a size, shape, type, or other attribute of the display device 136 or a display 150 of the display device 136. For example, in some embodiments, the computing device 101 may determine a size of the display device 136 or the display 150 based at least in part on sensor signals. The computing device 101 may determine and output a haptic effect to indicate to the user 204 the size of the display device 136. As an example, the computing device 101 may output a strong vibration to the user 204 if the display device 136 is a large display device (e.g., a large LED screen). In another example, the computing device 101 may output a weak vibration to the user 204 if the display device 136 is small display device (e.g., a smartwatch or wristband). In this manner, the haptic effects may indicate to the user 204 a size, or other attribute, of the display device 136 or the display 150, which may be displaying content relevant to the user 204.

In some embodiments, the computing device 101 may be configured to provide content to the display device 136. For example, the computing device 101 may transmit data that includes content and the display device 136 may be configured to display the content (e.g., via the display 150). The computing device 101 may output one or more haptic effects associated with the content displayed on the display device 136. For example, the content may comprise a video, or a video game, and the computing device 101 may output one or more haptic effects that correspond to the video game or video content displayed on the display device 136. As an example, the video content may include one or more actions or interactions (e.g., interaction between characters or objects in the video). The computing device 101 can output one or more vibrations associated with the actions or interaction so that the user may perceive the actions and/or interactions as they are displayed on the display device 136.

In some embodiments, the display device 136 may comprise a sensor 206 for detecting a presence or proximity of the computing device 101. In some embodiments, the sensor 206 may be configured to detect a line-of-sight or field of view 208 of the user 204 or a direction of an eye gaze 210 of the user 204. In the embodiment shown in FIG. 2, the display device 136 comprises the sensor 206, which may be configured in substantially the same manner as the camera 156 or the sensor 158 of FIG. 1.

In some embodiments, the display device 136 may transmit data to the computing device 101 based at least in part on data from the sensor 206. For example, the sensor 206 may detect the presence or proximity of the computing device 101 (e.g., via a Bluetooth signal) and transmit data indicating an availability, location, or attribute of the display device 136 based on data from the sensor 206.

As another example, the sensor 206 may detect a field of view 208 of the user 204 or the direction of the eye gaze 210 of the user. The display device 136 may transmit data indicating an availability, location, or attribute of the display device 136 based on data from the sensor 206. As an example, the display device 136 may determine that the user 204 is looking at, or in the direction of, the display device 136 or the display 150 of the display device, based on data from the sensor 206 and transmit data to the computing device 101 about an availability, location, or attribute of the display device based on this determination. In some embodiments, the computing device 101 may output one or more haptic effects to the user 204 based on the availability, location, or attribute of the display device 136 as described above.

In some embodiments, the display device 136 may determine a haptic effect based at least in part on data from the sensor 206. For example, in some embodiments, the display device 136 may determine a haptic effect based on the field of view 208 of the user 204 or the direction of the eye gaze 210 of the user. In one such embodiment, the display device 136 determines that the user 204 is looking at, or in the direction of, the display device 136 or the display 150, based on data from the sensor 206 and may output a haptic effect (e.g., a vibration) to a user 212 of the display device 136 (e.g., to a wrist, hand, arm, leg, hand of the user). The haptic effect may indicate to the user 212 that the user 204 is looking at the display device 136 or the display 150. For example, in the embodiment shown in FIG. 2, the display device 136 may output a haptic effect at the user's wrist 214 to indicate to the user 212 that the user 204 is reading or viewing content on the display 150 of the display device that may be relevant to the user 204 (e.g., content transmitted from the computing device 101 to the display device 136). In some embodiments, the user 212 may keep the display device 136 in position in response to the haptic effect. In another embodiment, the user 212 may move the display device 136 out of the field of view 208 of the user 204 in response to the haptic effect.

In some embodiments, the display device 136 may output one or more other haptic effects to the user 212 to indicate to the user 212 how the user may orient the display device 136 based on data from the sensor 206. For example, the sensor may detect that the direction of the eye gaze 210 of the user 204 is toward a top portion of the display 150. The display device 136 may output one or more haptic effects to the user 212 based on data from the sensor 206. The haptic effects may indicate to the user 212 that the user should rotate the user's wrist 214 such that the user 204 can view content on top portion of the display 150. As an example, the display device 136 may output a vibration toward the top of the display device (e.g., toward the top of user's wrist 214) to indicate to the user 212 that the user 204 is looking at the top of the display 150, which may cause the user 212 to adjust the display device 136 accordingly.

Figure 3:
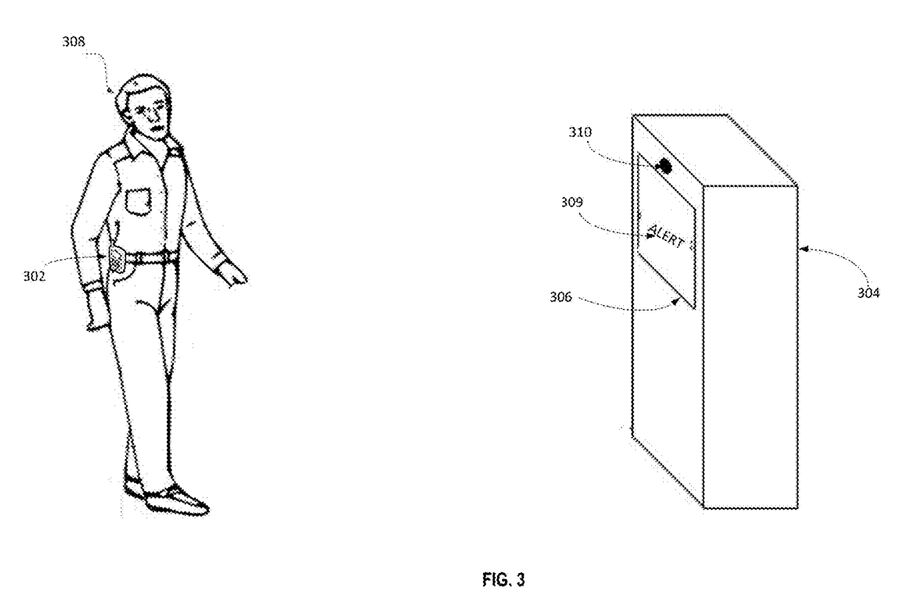
FIG. 3 shows another embodiment of a system for haptic feedback for opportunistic displays according to another embodiment.

FIG. 3 shows another embodiment of a system for haptic feedback for opportunistic displays according to another embodiment. In the example depicted in FIG. 3, the system comprises a computing device 302, which comprises a smartphone or a tablet, and an opportunistic display device 304. Computing device 302 comprises a sensor (not shown), which may detect a presence, availability, or location of the opportunistic display device 304. The opportunistic display device 304 comprises any device that includes a display 306. In some embodiments, the opportunistic display device 304 may comprise a sensor 310.

In the example depicted in FIG. 3, a user 308 of the computing device 302 may be walking by the opportunistic display device 304 and the computing device 302 may be in a pocket of the user 308 or elsewhere. The sensor of the computing device 302 may detect the opportunistic display device 304 when the user 308 is near opportunistic display device 304 (e.g., when the opportunistic display device 304 is within a field of view of the user 308). In some embodiments, the sensor may detect the opportunistic display device 304 upon occurrence of an event. An event, as used herein, is any interaction, action, or other event which occurs during operation of the computing device 302, which can potentially comprise an associated haptic effect. In some embodiments, an event may comprise a system status (e.g., low batter, low memory), a system notification (e.g., a notification generated based on the system receiving an incoming call, an alert, an update, an upcoming meeting reminder, etc.), receiving data (e.g., receiving a text message). For example, the computing device 302 may receive an alert or update (e.g., an alert regarding a meeting or news alert). The sensor may detect the opportunistic display device 304 within the field of view of the user 308 in response to the alert.

In some embodiments, the opportunistic display device 304 may detect the computing device 302 as the user 308 approaches the opportunistic display device 304. For example, the opportunistic display device 304 may include a sensor 310 (e.g., a camera or other sensor configured in substantially the same manner as sensor 206 of FIG. 2) that may detect the computing device 302 when the user 308 is near the opportunistic display device 304. In another embodiment, the sensor 310 may detect a field of view of the user 308, or a direction of an eye gaze of the user 308 (e.g., when user is looking in the direction of the opportunistic display device 304). In some embodiments, the opportunistic display device 304 may transmit a signal associated with an availability or location of the opportunistic display device 304 to the computing device 302 based on data from the sensor 310. For example, the opportunistic display device 304 may transmit a signal about the availability and location of the opportunistic display device 304 when the opportunistic display device 304 is within the field of view of the user 308.

In some embodiments, the computing device 302 may determine an availability or location of the opportunistic display device 304 based on sensor data (e.g., data from the sensor of the computing device 302 or data from the sensor 310 of the opportunistic display device 304). For example, the computing device 302 may determine if the opportunistic display device 304 is available to display content associated with an event (e.g., the alert received by the computing device 302) based on sensor data. The computing device 302 may transmit data to the opportunistic display device 304 in response to determining that the display device is available. The opportunistic display device 304 may display content associated with the event based on the data (e.g., via the display 306). In the example shown in FIG. 3, the computing device 302 transmits an alert 309 to the opportunistic display device 304 to be shown on display 306.

In some embodiments, the computing device 302 may determine and output a first haptic effect based at least in part on the availability of the opportunistic display device 304. For example, in some embodiments, the computing device 302 may determine the first haptic effect based on the opportunistic display device 304 displaying content associated with the event (e.g., when the opportunistic display device 304 is displaying the alert 309). The computing device may 302 may output the first haptic effect (e.g., a vibration, a squeeze, or a poke) to a body part of the user 308 (e.g., a hip or other body party) to indicate to the user 308 that the opportunistic display device 304 is displaying content relevant to the user 308 (e.g., that the opportunistic display device 304 is displaying the alert 309 received by the computing device 302).

In some embodiments, the computing device 302 may determine and output a second haptic effect based at least in part on a location or position of the opportunistic display device 304 (e.g., relative to the user 308). In some embodiments, the second haptic effect may comprise one or more haptic effects. In some embodiments, the computing device 302 may output the second haptic effect (e.g., a vibration) to a body part of the user to indicate a proximity or distance between the user 308 and the display device. For example, the computing device 302 may output a strong haptic effect (e.g., a strong vibration) to the user 308 to indicate that the opportunistic display device 304 is near the user 308. The computing device 302 may also output another haptic effect (e.g., vibration) at the top of the computing device 302 to indicate that the opportunistic display device 304 is in front of the user 308. As another example, the computing device may be worn on an arm of the user 308. The computing device 302 may output one or more haptic effects that can create the perception of a flow toward a direction toward the opportunistic display device 304 (e.g., by outputting a series of haptic outputs along the arm of the user 308), which can indicate a direction of the opportunistic display device 304 relative to the user. In some embodiments, the first and second haptic effects can be combined to form a single composite haptic effect for indicating the availability of the display device 304 and location of the display device 304 relative to the user 308.

In some embodiments, the computing device 302 may determine and output a third haptic effect based at least in part on the content displayed by the opportunistic display device 304. In some embodiments, the third haptic effect may comprise one or more haptic effects. For example, the computing device 302 may output haptic effects associated with the alert 309 displayed by display device. As an example, the alert 309 may be a video and the computing device 302 may output one or more haptic effects to the user 308 that correspond to the video displayed by the opportunistic display device 304. For example, the video can include a collision or a series of collisions (e.g., in a news alert or other alert) and the third haptic effect can be a series of vibrations corresponding to each collision, which allows the user to experience haptic effects associated with the one or more collisions in the video.

In some embodiments, the opportunistic display device 304 may comprise a haptic output device. In such embodiments, the opportunistic display device 304 may determine and output a haptic effect based on data from the sensor 310. For example, in one such embodiment, the sensor 310 may detect the computing device 302 as the user 308 nears the opportunistic display device 304 or may detect the field of view of the user 308. The opportunistic display device 304 may be communicatively coupled to the computing device 302 (e.g., for receiving data associated with content to be displayed by the opportunistic display device 304). The opportunistic display device 304 may output a haptic effect (e.g., a puff of a solid, liquid, or gas or a vibration) as the user 308 nears the opportunistic display device 304. The haptic effect may indicate to the user 308 that the opportunistic display device 304 is available (e.g., displaying the alert 309 received by the computing device 302) or may indicate the location of the opportunistic display device 304 relative to the user 308. As an example, the opportunistic display device 304 can output a strong vibration when the user 308 is near the opportunistic display device 304 to indicate that the alert 309 is being displayed and to indicate the location of the opportunistic display device 304.

Illustrative Methods for Haptic Feedback for Opportunistic Displays

Figure 4:
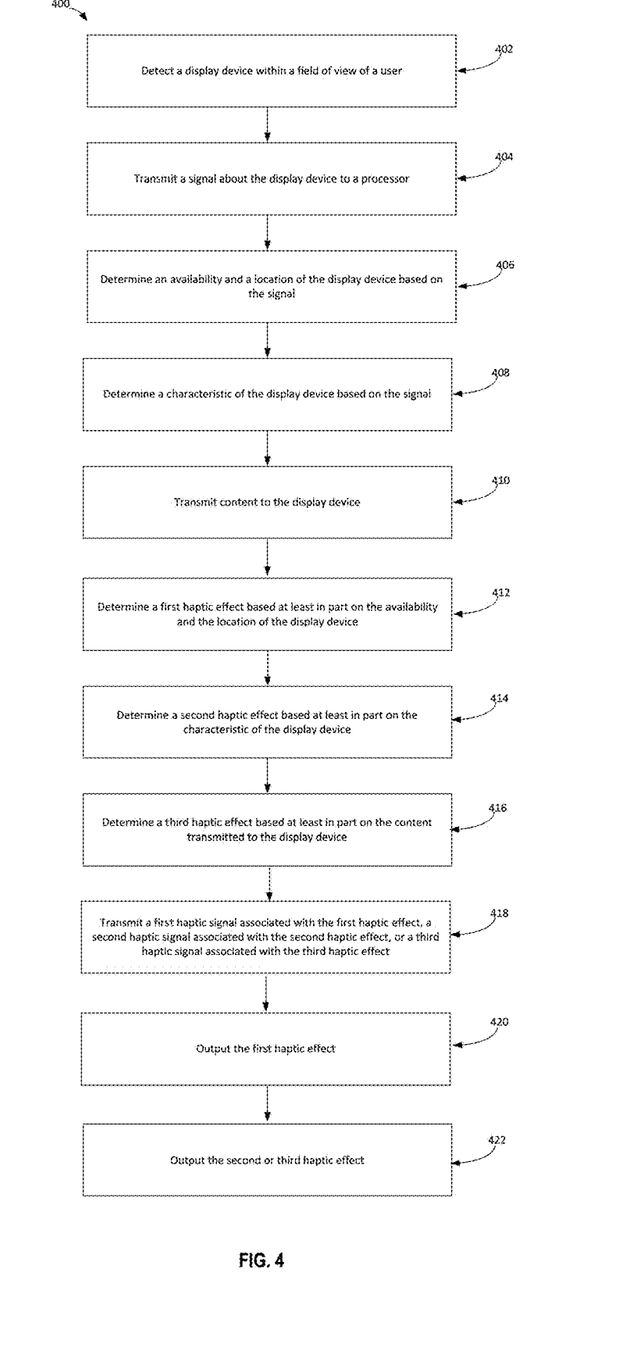
FIG. 4 is a flow chart of steps for performing a method for providing haptic feedback for opportunistic displays according to one embodiment.

FIG. 4 is a flow chart of steps for performing a method 400 for providing haptic feedback for opportunistic displays according to one embodiment. In some embodiments, the steps in FIG. 4 may be implemented in program code that is executable by a processor, for example, the processor in a general purpose computer, a mobile device, or a server. In some embodiments, these steps may be implemented by a group of processors. In some embodiments, one or more steps shown in FIG. 4 may be omitted or performed in a different order. Similarly, in some embodiments, additional steps not shown in FIG. 4 may also be performed. The steps below are described with reference to components described above with regard to the systems shown in FIGS. 1 and 2.

The method 400 begins at step 402 when the sensor 132 of the computing device 101 detects one or more display devices 136 within a field of view of a user 204. In some embodiments, the sensor 132 can detect a display device 136 near the sensor 132 or the computing device 101. The display device 136 can be an opportunistic display, which includes a display device that is near the sensor 132 or the computing device 101 and can be used to display content. In some embodiments, the display device 136 is within the field of view of a user 204 such that the display device 136 can be used to display content to the user 204. For example, the sensor 132 can detect the presence and location of display devices 136 by analyzing the strength of a Bluetooth signal between the sensor 132 and the display device 136. In some embodiments, the sensor 132 may detect a distance between the sensor 132, the computing device 101, and the display device 136 (e.g., based on the strength of the Bluetooth signal between in the sensor 132 and the display device 136).

The method 400 continues at step 404 when a signal about the display device 136 is transmitted to a processor 102. In some embodiments, the sensor 132 transmits the signal about the display device 136 to the processor 102. In other embodiments another sensor associated with the display device (e.g., the sensor 206 of the display device 136) transmits the signal about the display device 136.

The method continues at step 406 when the processor 102 determines an availability and a location of the display device 136 based on the signal. In some embodiments the processor 102 determines the availability of display device 136 to display content (e.g., texts, images, sounds, videos, animated graphics, etc.) to the user 204. For example, the processor 102 can determine if the display device 136 is discoverable and available to connect to the computing device 101 via Bluetooth to receive content from the computing device 101. In some embodiments, the processor 102 can be configured to provide the content to the display device 136 (e.g., in step 410 described below).

In some embodiments, the processor 102 determines a location of the display device 136 relative to the user 204. For example, the processor 102 determines a horizontal and vertical position of the display device 136 relative to the user 204.

The method 400 continues at step 408 when the processor 102 determines a characteristic of the display device 136 based on the signal. In some embodiments, the processor 102 determines a type, size, or shape of the display device 136 based on the signal from the sensor. For instance, the processor 102 determines that the display device 136 is a large display device (e.g., a large LCD screen) or a small display device (e.g., a smartwatch). As another example, the processor 102 determines the type of the display device 136, for example, whether the display device 136 is a LCD screen or a smartwatch.

The method 400 continues at step 410 when the processor 102 transmits content to the display device 136. In some embodiments, the content provision module 129 causes the processor 102 to transmit content to the display device 136. For example, the processor 102 can transmit a text message or an alert to the display device 136 if the processor 102 determines that the display device 136 is available (e.g., in step 406).

The method 400 continues at step 412 when the processor 102 determines a first haptic effect based at least in part on the availability and the location of the display device 136. In some embodiments, the haptic effect determination module 126 causes the processor 102 to determine the first haptic effect. In some embodiments, the first haptic effect can include one or more haptic effects. For example, the first haptic effect can include an availability haptic effect based on the availability of the display device 136 and a location haptic effect based on the location of the display device 136.

For example, the processor 102 can determine the first haptic effect (e.g., a series of vibrations) associated with the display device 136 being available (e.g., available to display content received from the computing device 101 and/or displaying content from the computing device 101) and the horizontal and vertical position of the display device 136 relative to the user 204. As an example, the first haptic effect can include a first vibration that indicates to the user 204 that the display device 136 is displaying content followed by a series of intermittent vibrations to be output to a left or right side of the computing device 101 or body part of the user 204 for indicating the horizontal position of the display device 136 relative to the user and/or a series of intermittent vibrations to be output to a top or bottom portion of the computing device 101 or a body part of the user 204 to indicate the vertical position of the display device 136 relative to the user 204.

The method 400 continues at step 414 when the processor determines a second haptic effect based at least in part on a characteristic of the display device 136. In some embodiments, the haptic effect determination module 126 causes the processor 102 to determine the second haptic effect.

For example, the processor 102 can determine the second haptic effect based on a size, type, shape, or other attribute of the display device 136. As an example, the second haptic effect can be a strong vibration if the display device 136 is a large display device (e.g., a large LCD screen). As another example, the second haptic effect can be a weak vibration if the display device is a small display device (e.g., a smartwatch).

The method 400 continues at step 416 when the processor determines a third haptic effect based at least in part on the content transmitted to the display device 136 (e.g., in step 410). In some embodiments, the haptic effect determination module 126 causes the processor 102 to determine the third effect.

For example, if the content transmitted to the display device 136 is a video, the processor 102 can determine a third haptic effect that corresponds to the video. As an example, the video may include one or more explosions or collisions and the third haptic effect can comprise one or more vibrations that correspond to the explosions or collisions.

The method continues at step 418 when the processor 102 transmits a first haptic signal associated with the first haptic effect to the haptic output device 118, a second haptic signal associated with the second haptic effect, or a third haptic signal associated with the third haptic effect to the haptic output device 118. In some embodiments, the processor 102 may transmit one or more of the first, second, and third haptic signals to the haptic output device 118. In some embodiments, the haptic effect generation module 128 causes the processor 102 to generate and transmit the first, second, and third haptic signals to the haptic output device 118.

The method 400 continues at step 420 when haptic output device 118 outputs the first haptic effect based on the availability and location of the display device 136. In some embodiments, the first haptic effect comprises a vibration, a surface deformation, a squeeze, a poke, and/or a puff of a solid, liquid, gas, or plasma. In some embodiments, the first haptic effect can indicate to the user 204 that the display device 136 is displaying content relevant to the user 204 (e.g., content transmitted from the computing device 101 to the display device 136) and indicate to the user 204 the location of the display device 136. In this manner, the user 204 can be alerted to view content being displayed on the display device 136, which may be relevant to the user 204.

The method 400 continues at step 422 when the haptic output device 118 outputs the second haptic effect based on the characteristic of the display device 136 or the third haptic effect based on the content transmitted to the display device 136. In some embodiments, the second or third haptic effect can each comprise a vibration, a surface deformation, a squeeze, a poke, and/or a puff of a solid, liquid, gas, or plasma. In some embodiments, the second haptic effect can indicate to the user 204 the size, type, or shape of the display device 136 that is displaying content relevant to the user. The third haptic effect can allow the user 204 to perceive haptic effects associated with content displayed by the display device 136.

Figure 5:
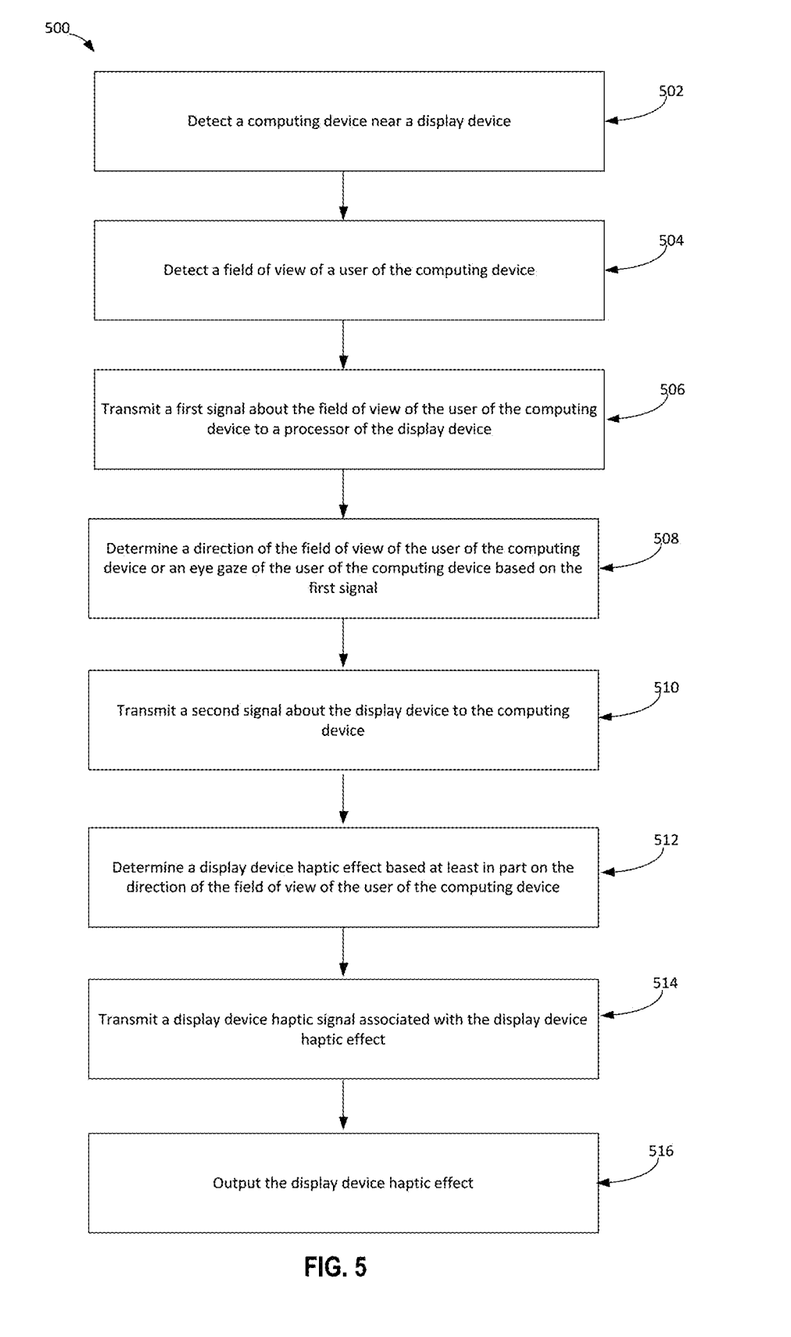
FIG. 5 is a flow chart of steps for performing another method for providing haptic feedback for opportunistic displays according to another embodiment.

FIG. 5 is a flow chart of steps for performing another method 500 for providing haptic feedback for opportunistic displays according to another embodiment. In some embodiments, the steps in FIG. 5 may be implemented in program code that is executable by a processor, for example, the processor in a general purpose computer, a mobile device, or a server. In some embodiments, these steps may be implemented by a group of processors. In some embodiments, one or more steps shown in FIG. 5 may be omitted or performed in a different order. Similarly, in some embodiments, additional steps not shown in FIG. 5 may also be performed. The steps described below are described with reference to components described above with regard to the systems shown in FIGS. 1 and 2.

The method 500 begins at step 502 when the sensor 206 of the display device 136 detects the computing device 101 near the display device 136. In some embodiments, the sensor 206 may detect a presence or proximity of the computing device 101. For example, the sensor 206 may include a Bluetooth device that can detect the presence and proximity the computing device 101 by analyzing signal strength between the sensor 206 and the computing device 101 (e.g., by determining if the computing device 101 is discoverable and determining a proximity of the computing device 101 based on the strength of the Bluetooth signal).

The method 500 continues at step 504 when the sensor 206 detects a field of view 208 of a user 204 of the computing device 101. In some embodiments, the sensor 206 comprises a camera, or other suitable device, that can detect the field of view 208 or a direction of an eye gaze 210 of the user 204.

The method continues at step 506 when a first signal about the field of view 208 or the direction of an eye gaze 210 of the user 204 is transmitted to a processor 138 of the display device 136. In some embodiments, the sensor 206 transmits the first signal to the processor 138.

The method continues at step 508 when the processor 138 determines the direction of the field of view 208 or a direction of an eye gaze 210 of the user 204 based on the first signal (e.g., the first signal transmitted from the sensor 206 to the processor 138 in step 506).

For example, the sensor 206 can transmit data about the field of view 208 or the direction of the eye gaze 210 of the user 204 to the processor 138 of the display device 136. The processor 138 can determine that the user 204 is looking at, or in the direction of, the display device 136 based on the field of view 208 or the direction of the eye gaze 210 of the user 204. As an example, the sensor 206 can include a camera for monitoring movements of an eye of the user 204 or muscles near the eye of the user 204 and the processor 138 can determine the field of view 208 or the direction of the eye gaze 210 of the user 204 based on the monitored movements. As another example, the sensor 206 monitors or measures electrical activity of the muscles moving the eye of the user 204 and the processor 138 determines the field of view 208 or the direction of the eye gaze 210 of the user 204 based on the electrical activity of the muscles. The processor 138 can determine that the user 204 is looking at, or in the direction of, the display device 136 based on the field of view 208 or the direction of the eye gaze 210 of the user 204.

The method continues at step 510 when a second signal about the display device 136 is transmitted to the computing device 101 (e.g., to the processor 102 of the computing device 101). In some embodiments, the display device 136 can transmit the second signal to the computing device 101 based at least in part on the field of view 208 or the direction of the eye gaze 210 of the user 204.

For example, the processor 138 of the display device 136 can determine that the user 204 is looking at, or in the direction of, the display device 136 and the display device 136 can transmit the second signal indicating an availability, a location, or an attribute of the display device 136 to the computing device 101 based on the determination. In some embodiments, the computing device 101 can determine the availability, location, or attribute of the display device based on the second signal as described above.

The method continues at step 512 when the processor 138 determines a display device haptic effect based at least in part on the field of view 208 of the user 204. In some embodiments, the haptic effect determination module 164 of the display device causes the processor 138 to determine the display device haptic effect.

For example, the processor 138 can determine the display device haptic effect based on the user 204 of the computing device 101 looking at, or in the direction of, the display device 136 (e.g., in step 510). The processor 138 can determine the display device haptic effect to be output to a user 212 of the display device 136 to indicate to the user 212 that the user 204 is looking at, or in the direction of, the display device 136. As an example, the display device 136 can be a smartwatch and can vibrate briefly to indicate to the user 212 that the user 204 is looking at the display 150 of the display device 136 (e.g., the user 204 is viewing content on the display 150).

In some embodiments, the display device haptic effect can include one or more haptic effects. For example, the display device haptic effect can include a haptic effect (e.g., a brief vibration) to indicate to the user 212 that the user 204 is looking at the display device 136. The display device haptic effect can include another haptic effect (e.g., a strong vibration) to indicate to the user 212 that the user 212 should adjust an arm, wrist, leg, or hand to allow the use 204 to view content being displayed on the display device 136. As an example, the smartwatch can vibrate at the bottom of the smartwatch toward the bottom of the user's wrist 214 to indicate to the user 212 that the user 204 is looking at the bottom of the display device 136. The user 212 may adjust the user's wrist 214 in response to the display device haptic effect to allow the user 204 to better view the content on the display device 136 (e.g., rotate the wrist 214 such that the bottom of the display device 136 is more visible).

The method 500 continues at step 514 when the processor 138 transmits a display device haptic signal associated with the display device haptic effect to the haptic output device 160 of the display device 136. In some embodiments, the haptic effect generation module 168 causes the processor 138 to generate and transmit the display device haptic signal to the haptic output device 118.

The method 500 continues at step 516 when the haptic output device 160 outputs the display device haptic effect. In some embodiments, the display device haptic effect can be output to the user 212 of the display device 136 based on the direction of the field of view 208 of the user 204 of the computing device 101. In other embodiments, the display device haptic effect can be output to the user 204 of the computing device 101 based on the direction of the field of view 208 of the user 204. In some embodiments, the display device haptic effect comprises a vibration, a surface deformation, a squeeze, a poke, and/or a puff of a solid, liquid, gas, or plasma. In some embodiments, the display device haptic effect comprises one or more haptic effects for indicating to the user 212 that the user 204 is looking at the display device 136. In other embodiments, the display device haptic effect comprises one or more haptic effects for indicating to the user 204 that the display device 136 is available and for indicating the location of the display device 137 relative to the user 204.

GENERAL CONSIDERATIONS

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:
1. A system comprising:
a computing device;
a sensor communicatively coupled to the computing device and configured to transmit a first signal and a second signal;
a processor communicatively coupled to the sensor for receiving, the first signal and the second signal, the processor configured to:
  detect a display device proximate to the sensor based on the first signal and determine that the display device is within a field of view of a user of the computing device based on the second signal;
  determine, while the field of view of the user is directed away from the computing device, an availability of the display device to output content and a location of the display device based on the first signal or the second signal;

determine a first haptic effect based at least in part on the availability and the location of the display device; and transmit a first haptic signal associated with the first haptic effect; and a haptic output device configured to receive the first haptic signal and output the first haptic effect.

2. The system of claim 1, wherein the processor is further configured to transmit data that includes the content to the display device and the content includes text, an image, a sound, or a video.

3. The system of claim 2, wherein the processor is further configured to determine:

a second haptic effect based at least in part on the content and transmit a second haptic signal to the haptic output device configured to output the second haptic effect.

4. The system of claim 1, wherein the first haptic effect comprises a horizontal haptic effect associated with a horizontal position of the display device relative to the user and a vertical haptic effect associated with a vertical position of the display device relative to the user.

5. The system of claim 4, wherein the haptic output device comprises a first haptic output device and a second haptic output device, the first haptic output device configured to output the horizontal haptic effect and the second haptic output device configured to output the vertical haptic effect.

6. The system of claim 1, wherein the processor is further configured to:

determine a size, shape, or type of the display device based on the first signal or the second signal;

determine a second haptic effect based at least in part on the size, shape, or type of the display device; and transmit a second haptic signal to the haptic output device configured to output the second haptic effect.

7. The system of claim 1, wherein the processor is communicatively coupled to the display device and the processor is further configured to:

receive, from the display device, a display signal, wherein the display device comprises a display device processor configured to determine a direction of the field of view of the user based on data from a display device sensor configured to detect the field of view of the user; and determine the availability and the location of the display device based on the display signal.

8. The system of claim 7, wherein the display device sensor comprises a camera configured to capture an image associated with an eye of the user and the display device processor is configured to determine the direction of the field of view of the user based on the image.

9. The system of claim 7, wherein the display device sensor is configured to monitor a movement of a muscle in an eye of the user and the display device processor is configured to determine the field of view of the user based on the monitored movement.

10. The system of claim 7, wherein the display device comprises a display haptic output device and the display device processor is configured to:

determine a display device haptic effect based at least in part on the direction of the field of view of the user; and transmit a display device haptic signal associated with the display device haptic effect to the display haptic output device configured to output the display device haptic effect.

11. The system of claim 1, wherein the sensor is configured to transmit location signal associated with the user of the system or the sensor and receive data about the location and the availability of the display device based on the location signal.

12. A method comprising:

receiving, by a processor of a computing device from a sensor communicatively coupled to the computing device, a first sensor signal and a second sensor signal;

detecting, by the processor, a display device proximate to the sensor and within a field of view of a user of the computing device based on the first sensor signal and the second sensor signal;

determining, by the processor and while the field of view of the user is directed away from the computing device, an availability of the display device to output content to the user and a location of the display device based at least in part on the first sensor signal or the second sensor signal;

determining, by the processor, a first haptic effect based at least in part on the availability and the location of the display device;

transmitting, by the processor, a first haptic signal associated with the first haptic effect to a haptic output device; and outputting, by the haptic output device, the first haptic effect.

13. The method of claim 12, wherein the first haptic effect comprises a horizontal haptic effect associated with a horizontal position of the display device relative to the user and a vertical haptic effect associated with a vertical position of the display device relative to the user.

14. The method of claim 12, further comprising:

transmitting, by the processor, data that includes the content to the display device and the content includes an image, a sound, a video, or text.

15. The method of claim 14, further comprising:

determining, by the processor, a second haptic effect based at least in part on the content;

transmitting, by the processor, a second haptic signal associated with the second haptic effect to the haptic output device; and outputting, by the haptic output device, the second haptic effect.

16. The method of claim 12, further comprising:

determining, by the processor, a size, shape, or type of the display device based on the first sensor signal or the second sensor signal;

determining, by the processor, a second haptic effect based at least in part on the size, shape, or type of the display device;

transmitting, by the processor, a second haptic signal associated with the second haptic effect to the haptic output device; and outputting, by the haptic output device, the second haptic effect.

17. The method of claim 12, wherein determining the availability of the display device to output content to the user and the location of the display device further comprises:

receiving, by the processor, a display signal from the display device, wherein the display device comprises a display device processor configured to determine a direction of the field of view of the user based on data from a display device sensor configured to detect the field of view of the user, wherein the processor is communicatively coupled to the display device; and determining the availability and the location of the display device based at least in part on the display signal.

18. The method of claim 17, wherein the display device sensor comprises a camera configured to capture an image associated with an eye of the user and the display device processor is configured to determine the direction of the field of view of the user based on the image.

19. The method of claim 17, wherein the display device sensor is configured to monitor a movement of an eye of the user and the display device processor is configured to determine the field of view of the user based on the monitored movement.

20. The method of claim 17, wherein the display device comprises a display haptic output device and the method further comprises:
- determining, by the display device processor, a display device haptic effect based at least in part on the direction of the field of view of the user; and
- transmitting, by the display device processor, a display device haptic signal associated with the display device haptic effect to the display haptic output device configured to output the display device haptic effect.

* * * * *